Feb. 17, 1948.   M. A. HYDE ET AL   2,436,302
ALTERNATING CURRENT MOTOR STARTING BY MEANS OF CAPACITORS
Filed Dec. 24, 1943

WITNESSES:
E. G. McCloskey
F. P. Lyle

INVENTORS
Merritt A. Hyde and
Ralph E. Marbury.
BY
O. D. Buchanan
ATTORNEY

Patented Feb. 17, 1948

2,436,302

UNITED STATES PATENT OFFICE 2,436,302

ALTERNATING CURRENT MOTOR STARTING BY MEANS OF CAPACITORS

Merritt A. Hyde and Ralph E. Marbury, Wilkinsburg, Pa., assignors to Westinghouse Electric Corporation, East Pittsburgh, Pa., a corporation of Pennsylvania Application December 24, 1943, Serial No. 515,522

2 Claims. (Cl. 318—200)

The present invention relates to the problem of starting electric motors, and especially motors of relatively large size, under conditions where the available power supply is capable of supplying the motor under normal running conditions, but cannot supply the required motor starting current without a drop in line voltage which is greater than can be permitted, and it relates, particularly, to the use of capacitors for starting motors under these conditions, and preventing excessive drops in line voltage.

It is sometimes necessary to use electric motors in places where the available power supply is just adequate for supplying the motor under normal operating conditions, but is not adequate for starting the motor. Such conditions may be encountered when the motor is located in remote or isolated places, or at or near the end of a distribution line of high resistance and reactance, or where the motor is used in a location which is determined by considerations other than the availability of a suitable power supply, such as pumping stations on oil pipe lines, for example.

In such cases, great difficulty is encountered in starting the motor because of the drop in line voltage caused by the large starting current. This is especially true in the case of relatively large motors, where the large reactive components of the starting current may cause the voltage of the line to drop to a value which is too low to allow the motor to be successfully started, or which is too low to be permitted because of its effect on other loads on the same line. In many such cases, it is not possible, because of cost, or for other reasons, to construct additional facilities for supplying the motor, and some other means must be resorted to in order to make it possible to use an electric motor under such circumstances at all.

One obvious means of overcoming these difficulties would be the use of shunt capacitors to neutralize part or all of the reactive component of the motor starting current, and thus to prevent excessive drop in line voltage. There are certain difficulties, however, which have prevented the use of shunt capacitors for this purpose in the past. In order to provide the necessary compensation for the reactive component of motor starting current in the case of motors of large size, such as several hundred horsepower, it would be necessary to use relatively large capacitors. When the motor starting current decreases at the end of the starting period, the large capacitive current of the capacitor would cause a rise in line voltage which would be too great to be tolerated because of its effect on other loads on the line. This voltage rise can, of course, be kept to relatively short duration by disconnecting the capacitor at the end of the motor starting period, but it would be too great in most cases to be permitted even for a short time, especially as this voltage rise would occur each time the motor was started.

Another problem involved in the use of capacitors that are large in comparison to the rating of the motor, for starting large motors, is the danger of excessive self-excited voltages in the motor in case the motor should become disconnected from the line while running at a speed near its full rated speed with the capacitor still connected to the motor. If this should occur, the motor would operate as a self-excited induction generator, the excitation being supplied by the capacitor, and a very high voltage might occur which would be dangerous to the motor insulation, the value of the self-excited voltage being determined by the size of the capacitor and the saturation curve of the motor. Because of these difficulties in the use of shunt capacitors for starting electric motors, it has not been practical heretofore to employ this means for overcoming the difficulties involved in starting motors at the end of high resistance, high reactance distribution lines, or in other locations where the power supply is just adequate for normal running conditions.

The principal object of the present invention is to provide means for utilizing capacitors for making possible, or for facilitating, the starting of electric motors under the conditions described above, without causing excessive rise in line voltage and without the danger of high self-excited voltages in the motor.

A further object of the invention is to provide means for starting electric motors, or other loads, in which capacitors are utilized to neutralize part or all of the reactive component of the load current to prevent excessive drop in the line voltage, and in which additional means are provided for neutralizing the effect of the capacitor when the motor starting current drops at the end of the starting period, so as to prevent excessive rise in line voltage.

Another object of the invention is to provide means for starting electric motors under the conditions described above, in which a capacitor is connected to the motor for starting purposes only, and in which additional means are provided responsive to the line voltage for neutralizing the effect of the capacitor in response to rise in the line voltage when the motor starting current decreases, together with means for automatically disconnecting the capacitor and associated equipment from the motor at the end of the motor starting period.

A more specific object of the invention is to provide means for starting electric motors in which a capacitor is used to neutralize part or all of the reactive component of the motor starting current, and in which a saturable iron-core inductive means is provided to neutralize part or all of the capacitor current when the line voltage rises as the motor starting current decreases at the end of the starting period, so that the capacitor prevents excessive drop in line voltage during the starting period, and the saturable inductive means prevents the excessive rise in line voltage which would be caused by the capacitor at the end of the starting period before the capacitor could be disconnected.

The invention will be more fully understood from the following detailed description, taken in connection with the accompanying drawing, in which Figure 1 is a schematic wiring diagram showing an illustrative embodiment of the invention;

Figure 1:
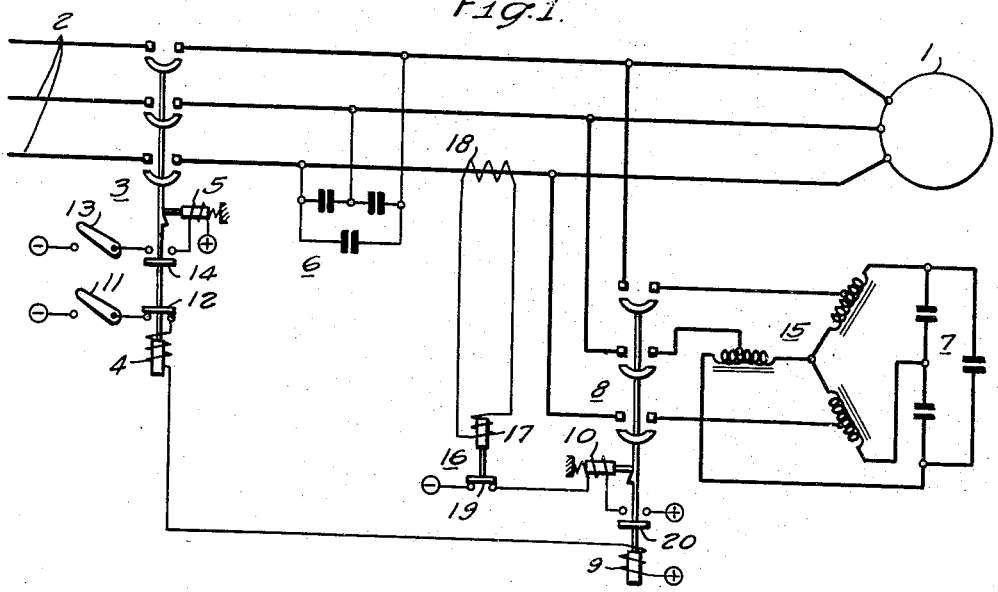

Figure 1 shows an arrangement embodying the invention for the purpose of starting an electric motor 1 supplied by a three-phase alternating current line 2, the characteristics of which are such that it is capable of supplying the motor 1 under normal running conditions, but which would be subject to a greater drop in voltage than could be permitted under starting conditions if no special provisions for starting the motor were made. The motor 1 may be any type of alternating current motor, either single-phase or polyphase, which requires a large starting current at low power factor, such as a squirrel-cage induction motor. The motor 1 is shown as a three-phase motor and is connected to the line 2 by means of a circuit breaker 3, which is shown as being of the latching type, having a closing coil 4 and a trip coil 5. If desired, a continuously energized capacitor bank 6 may be provided for improving the power factor of the motor 1 under normal running conditions, and the capacitor bank 6 is preferably connected as shown on the motor side of the circuit breaker 3, so that it is energized when the motor is connected to the line and deenergized when the motor is disconnected.

As previously explained, the motor 1 requires a starting current having a large reactive component which the line 2 is not capable of supplying without an excessive voltage drop which might make it impossible to start the motor, or to accelerate the load to normal speed. In order to neutralize this reactive component of the starting current, so as to prevent the excessive voltage drop, a capacitor bank 7 is connected across the terminals of the motor 1 during the starting period by means of a circuit breaker 8. The circuit breaker 8 is shown as being of similar type to the circuit breaker 3, and has a closing coil 9 and a trip coil 10. The circuit breakers 3 and 8 are controlled in any suitable manner to connect the starting capacitor 7 to the line substantially simultaneously with the energization of the motor 1 and, as shown, the closing coils 4 and 9 may be connected in series for simultaneous energization to effect substantially simultaneous closure of the circuit breakers 3 and 8. The coils 4 and 9 may be controlled in any suitable manner, indicated by the manual switch 11, and an auxiliary contact 12 on the circuit breaker 3 interrupts the circuit of the closing coils 4 and 9 when the breaker 3 reaches its closed position. The breaker 3 is tripped by energizing the trip coil 5 in any suitable manner, as by a manual switch 13, the circuit of the trip coil being interrupted by an auxiliary contact 14 on the breaker when it opens.

It will be apparent that the capacitor 7 can be chosen to neutralize a large part, or all, of the reactive component of the motor starting current, and that it will thus prevent excessive drop in line voltage. As the reactive component of the motor current decreases towards the end of the starting period, however, the capacitor current remains the same, and would cause an increase in the line voltage which, in turn, would tend to increase the capacitor current, resulting in a further rise in line voltage until a stable condition would be reached at an excessively high voltage.

In accordance with the present invention, this excessive rise in voltage is prevented by providing an additional lagging reactive current in opposition to the capacitor current, and controlling this reactive current so that it is quite small during most of the starting period but increases towards the end of the starting period when the reactive component of the motor starting current decreases and the line voltage starts to rise. This reactive current, as far as the capacitor is concerned, replaces the reactive motor current, and neutralizes part or all of the capacitor current, thus preventing the excessive rise in line voltage which would otherwise occur. This effect can most easily be obtained by the use of a voltage-responsive, variable-reactance inductive means, such as a saturable iron-core reactor, designed to saturate and increase its current when the line voltage tends to rise.

As shown in Figure 1, this inductive means may be a three-phase autotransformer 15 having a saturable iron core and connected across the starting capacitor bank 7. The autotransformer 15 may advantageously be connected, as shown, to step up the voltage applied to the capacitor bank 7 to permit the use of a smaller, and therefore cheaper, capacitor bank than would be required if it were operated at the line voltage. The autotransformer 15 is designed to saturate at a voltage corresponding approximately to the normal line voltage, or to a voltage somewhat greater than the minimum voltage which is to be permitted during starting, so that at voltages below this value, the magnetizing current of the autotransformer is relatively small, while at higher voltages the magnetizing current becomes quite large. Thus, when the line voltage starts to rise above the normal value, the reactive current of the autotransformer 15 tends to neutralize the capacitor current and prevents excessive rise in voltage.

The combination of the capacitor bank 7 and autotransformer 15 is connected to the motor 1 by means of the circuit breaker 8 for starting purposes only, and is disconnected by any suitable means at the end of the starting period. One suitable means for doing this is shown in the drawing for the purpose of illustration, and consists of a relay 16 having an operating coil 17 energized in accordance with the line current by means of a current transformer 18. The relay 16 has a normally closed contact 19 connected in series with the trip coil 10 of the circuit breaker 8, and is adjusted so as to open its contact 19 in response to the starting current of the motor 1, and to close its contact when the starting current decreases to a value approaching the normal full-load motor current.

Figure 2:
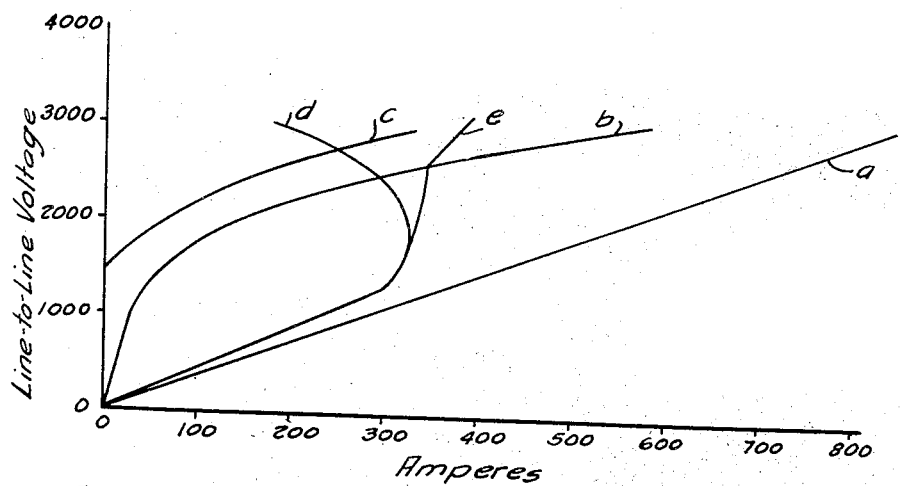
Fig. 2 is a diagram showing certain explanatory curves.

The effect of the combination of the capacitor bank 7 and saturable autotransformer 15 will be more fully understood from a consideration of the curves in Fig. 2, which show the characteristics of such a combination designed for use with a 600 horsepower, 2300 volt squirrel-cage induction motor. Curve a in this figure represents the capacitor current as a function of applied voltage and is, of course, a straight line. Curve b represents the autotransformer magnetizing current, or the reactive component of the autotransformer current, and curve c represents the power component of the autotransformer current. The total wattless current drawn by the combination is shown by curve d, which is obtained by subtracting the current values of curve b from those of curve a, and the resultant total current drawn by the autotransformer-capacitor combination is shown by the curve e, which is obtained by combining the current values of curves c and d. It will be seen from these curves that below a more or less definite voltage, which corresponds approximately to the minimum voltage necessary for starting the motor, the autotransformer has little effect, and substantially all of the capacitor current is available for neutralizing the reactive component of the motor starting current. Above this voltage, however, the reactive autotransformer current rapidly increases, and neutralizes the capacitor current with increasing effectiveness, finally resulting in an actual decrease in the resultant wattless current of the combination. It will be obvious that by suitable design of the autotransformer, or of an equivalent variable-reactance inductive device, any desired current characteristics can be obtained to neutralize the capacitor current, in response to increase in line voltage, to whatever extent may be necessary or desirable.

The operation of this system during starting of the motor 1 should now be apparent. In order to start the motor, the circuit breakers 3 and 8 are closed substantially simultaneously to connect the motor 1 to the line 2, and to connect the autotransformer 15 and capacitor 7 to the motor. The in-rush current to the motor 1 energizes the relay 16 to cause it to open its contact 19 substantially as soon as the breaker 3 closes, so that the trip coil 10 of the circuit breaker 8 remains deenergized and the breaker 8 remains closed. If necessary, or desired, any suitable additional means may also be provided to insure that the coil 10 is not energized before the relay 16 opens its contact 19. The motor 1 draws a high starting current during this period, while it is coming up to speed, which includes a large reactive component so that the line voltage tends to drop. The autotransformer 15 therefore has little effect at this time because of the low voltage, and the current of the capacitor 7 is fully effective in neutralizing the reactive component of the motor starting current to keep the voltage from becoming too low for successfully starting the motor. In effect, the capacitor 7 supplies the wattless current requirements of the motor 1 during starting and thus relieves the line 2 of this current, preventing the excessive voltage drop which would be occasioned by it.

As the motor comes up to speed towards the end of the starting period, the reactive component of the motor current starts to decrease, while the capacitor current remains at its previous value. This, of course, causes the line voltage to rise and increases the capacitor current, with resultant further rise in line voltage. As the line voltage rises, however, the lagging magnetization current drawn by the autotransformer 15 rapidly increases, as shown by the curve b of Fig. 2, and neutralizes the capacitor current in the manner shown by the curve d. Thus, the resultant wattless current of the capacitor-autotransformer combination is prevented from rising, and may be caused to actually decrease, as shown in Fig. 2, so that the rise in line voltage is prevented, or is kept to a reasonable value. As the motor starting current decreases and approaches the normal full-load current of the motor, the relay 16 closes its contact 19 and energizes the trip coil 10 of the circuit breaker 8 to cause the circuit breaker to open and disconnect the autotransformer 15 and capacitor 7 from the motor, the circuit of the trip coil 10 being interrupted by the auxiliary contact 20 on the circuit breaker 8 when the circuit breaker opens.

Thus, the present invention provides a means for starting large motors under conditions which would otherwise make it extremely difficult, or even impossible, to start the motor at all, by preventing the line voltage from dropping during starting to a value which would be too low to bring the motor up to speed, or which would be too low to be permitted because of its effect on other loads on the line. The arrangement described also prevents the occurrence of dangerously high self-excited voltages in the motor in case it becomes disconnected from the line with the capacitor 7 still connected to the motor, since the saturable inductive means operates in the manner described above to neutralize the effect of the capacitor at an increasing rate as the voltage rises, and thus prevents the capacitor from exciting the motor sufficiently to generate a dangerously high self-excited voltage.

Figure 3:
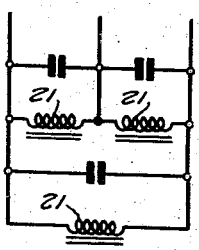
Fig. 3 is a wiring diagram showing an alternative form of the invention.

It will be apparent that the invention is capable of various modifications and embodiments. Thus, as shown in Fig. 3, a saturable iron-core reactor 21 may be connected across each phase of the capacitor bank 7 in place of the auto-transformer 15, and it will be obvious that if the reactors 21 are suitably designed, the operation will be the same as that described above. Thus any suitable combination of capacitors and variable-reactance inductive means may be used within the scope of the invention to effect a neutralization of part or all of the capacitor current in response to an increase in the line voltage, so as to prevent excessive voltage rise. It is to be understood, therefore, that the terms "reactor" and "inductive means," as used herein, include any suitable device either single-phase or polyphase, which has the necessary characteristics explained above. Similarly, the term "capacitor" means either a single capacitor unit, or a bank consisting of a plurality of individual capacitor units connected either in a single-phase or a polyphase arrangement as may be required. The continuously energized capacitor bank 6 is desirable in many cases for improving the power factor of the motor 1 under normal operating conditions, but it is not a part of the invention and may be omitted if desired. It will also be obvious that the usefulness of the invention is not restricted to connection at or near the terminals of a motor, but it may be used on any alternating current line which is subject to variable reactive load currents which may become great enough to cause excessive voltage drop.

Although a particular embodiment of the invention has been described for the purpose of illustration, it will be obvious that it is capable of various changes and modifications without departing from the spirit of the invention, and it is to be understood, therefore, that the invention is not limited to the specific arrangement shown but, in its broadest aspects, it includes all equivalent embodiments and modifications which come within the scope of the appended claims.

We claim as our invention:

1. A system for facilitating the starting of electric motors on lines of limited capacity, said system comprising means for connecting a motor to a line, a capacitor bank having constant reactance such that the leading current drawn by the capacitor bank when connected to the line neutralizes at least a major part of the lagging component of the motor starting current, saturable iron-core inductance means connected in parallel with said capacitor bank, said inductance means being adapted to saturate at substantially the normal line voltage, and being adapted, when saturated, to draw a lagging current which substantially neutralizes the leading current of the capacitor bank, and means for connecting the capacitor bank and the inductance means to the line substantially simultaneously with connection of the motor to the line and for disconnecting the capacitor bank and inductance means from the line after the motor has started.

2. A system for facilitating the starting of electric motors on lines of limited capacity, said system comprising means for connecting a motor to a line, a capacitor bank having constant reactance such that the leading current drawn by the capacitor bank when connected to the line neutralizes at least a major part of the lagging component of the motor starting current, saturable iron-core inductance means connected in parallel with said capacitor bank, said inductance means being adapted to saturate at substantially the normal line voltage, and being adapted, when saturated, to draw a lagging current which substantially neutralizes the leading current of the capacitor bank, means for connecting the capacitor bank and inductance means to the line substantially simultaneously with connection of the motor to the line, and current-responsive means for disconnecting the capacitor bank and inductance means from the line when the motor current has fallen to substantially its normal running value.

MERRITT A. HYDE.
RALPH E. MARBURY.

REFERENCES CITED

The following references are of record in the file of this patent:

UNITED STATES PATENTS

| Number | Name | Date |
|---|---|---|
| 1,646,240 | Goodwin | Oct. 18, 1927 |
| 1,993,924 | Espley | Mar. 12, 1935 |
| 1,698,581 | Campbell | Jan. 8, 1929 |
| 1,708,910 | Spencer | Apr. 9, 1929 |
| 1,725,558 | Ballman | Aug. 20, 1929 |
| 1,843,921 | Gay | Feb. 9, 1932 |
| 1,872,348 | Rudenberg et al. | Aug. 16, 1932 |
| 1,669,505 | Crichton | May 15, 1928 |
| 2,136,863 | Owen | Nov. 15, 1938 |

FOREIGN PATENTS

| Number | Country | Date |
|---|---|---|
| 602,010 | France | Dec. 16, 1925 |
| 403,958 | England | Dec. 27, 1933 |
| 182,876 | England | July 3, 1922 |